July 27, 1926. 1,594,324
P. P. PAYNE
SMOKE CONSUMER AND HEAT ECONOMIZER
Filed March 21, 1921
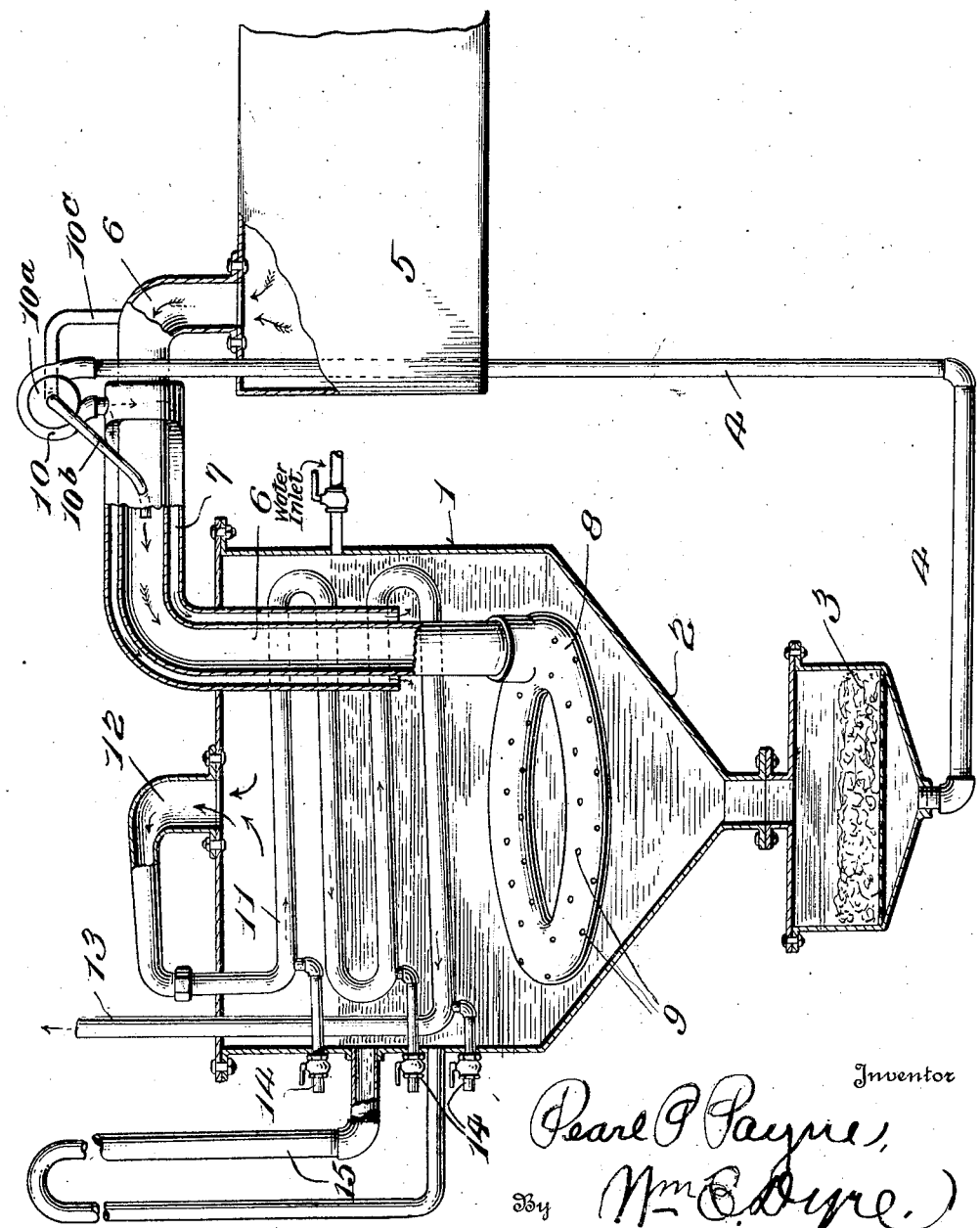

Patented July 27, 1926.

1,594,324

UNITED STATES PATENT OFFICE.

PEARL PENELOPE PAYNE, OF VERMILION, SOUTH DAKOTA.

SMOKE CONSUMER AND HEAT ECONOMIZER.

Application filed March 21, 1921. Serial No. 454,144.

This invention relates to smoke consuming apparatus of a type set forth in U. S. Letters Patent No. 1,363,992, granted to me December 28, 1920, and has for an object the production of an apparatus for treating the products of combustion from a furnace by removing the dirt and soot contained therein, and extracting the heat therefrom for purposes of radiation.

Another object of my invention is to produce an apparatus for extracting the soot, dirt and heat from the products of combustion by directing them into a body of water containing a solution of lime, and subsequently causing the circulation of said water through a bed of charcoal for purposes of purification.

A further object of the invention is to provide an apparatus of this character including a receptacle adapted to contain water, the water being directly heated by discharging the products of combustion into the same, and means are associated with this receptacle for utilizing this heated water for heating a room or the like.

A still further object of the invention is to produce an apparatus arranged separately and apart from the fire box, said apparatus having means for returning the rising gases and vapors from the products of combustion in a conduit to the liquid content for extracting a maximum amount of heat, and further means for returning the filtered portion of the liquid around the pump for preventing the pump from becoming overheated, and around the smoke conveying conduit for preventing the escape of heat by radiation from the combustion gases.

These and other objects will in part be obvious, reference being had to the accompanying drawing illustrating an embodiment of my invention.

Generally stated, my invention includes a receptacle or reservoir having a liquid content into which lime has been deposited; a smoke conveying conduit having a perforated discharge end; means including a pump for delivering the products of combustion to the liquid content; means for collecting and filtering the liquid into which the products of combustion are discharged; and means for returning the filtered liquid to the receptacle.

In the drawings, the receptacle or reservoir 1 may be of any suitable size, and is provided with a conical or funnel shaped bottom portion 2 as shown. The saturated liquid passes from the funnel shaped outlets to suitable filtering means shown in the present case as a charcoal bed 3 located beneath the receptacle 1.

Leading from the purifying device and more especially from beneath the charcoal bed is a pipe or conduit 4 adapted to return the filtered liquid to the receptacle in a manner to be presently described.

A suitable firebox is indicated at 5 and a smoke conduit 6 extends from the firebox to the receptacle 1, serving to conduct the products of combustion from the firebox to said receptacle. The fire box 5 in my present disclosure is located separately from the receptacle and contained apparatus and the pipe 4 passes through the fire box, so that the water in pipe 4 is thus heated.

The smoke or products of combustion conduit 6 is preferably surrounded by a jacket or casing 7, through which the purified liquid from the pipe 4 flows on its return to the receptacle 1. The discharge end 8 of the pipe 6 is of annular form and provided with a plurality of perforations 9 through which the smoke is discharged into the liquid within the receptacle 1. The perforations may be of any suitable size and serve to distribute the smoke into the liquid content without gushing, as will be understood.

A pump $10^a$ is provided for accelerating delivery of the products of combustion to the receptacle 1. This pump has an inlet pipe $10^c$ which draws a portion of the products of combustion from the pipe 6 and feeds the same through the pipe $10^b$ back into the conduit at an accelerated speed, so that a draft is created within the conduit 6. It will be understood that the products of combustion passing through the pump, will heat the latter and to prevent overheating, the upper end of the pipe 4 is connected to a curved pipe 10 which passes around the pump and discharges into the jacket casing 7.

The means for collecting the rising vapors and gases within the receptacle and returning them to the liquid content therein for further heating the latter, comprises a coil 11 having communication through a pipe 12 with the interior of the receptacle 1. These gases are directed through the coil which extends into the liquid and thence pass out the pipe 13. The return of the gases through the coil serves to further extract such heat as may be contained therein. Suitable valve controlled drain pipes 14 are provided in each coil, which as shown are preferably slanted to permit of the complete clearing and drawing of any liquid of condensation which may be developed.

A suitable heat circulating connection or pipe 15 extends from the receptacle and may be used as a radiator for heating a room or the like. Lime is deposited into the liquid content to assist in more effective and greater longevity of use of the apparatus.

The apparatus has many uses to which it may be applied. I do not limit myself to the exact disclosure herein. Also various changes in the arrangement, size and construction of the several parts may be resorted to without departing from the spirit of my invention.

I claim:

1. A smoke washer and heat economizer adapted for use with a combustion chamber comprising a receptacle arranged exteriorly of the chamber and containing water to be heated, a conduit leading from the combustion chamber to the lower portion of the receptacle for discharging products of combustion from the chamber beneath the surface of the water in the receptacle, a water jacket extending along said conduit and having its outlet end within the receptacle, a pump for creating a draft within said conduit, a pipe leading from the lower portion of the receptacle through the combustion chamber, passing around the pump and discharging into the jacket, and means for discharging the products of combustion from the upper portion of the receptacle.

2. A smoke washer and heat economizer adapted for use with a combustion chamber comprising a receptacle arranged exteriorly of the chamber and containing water to be heated, a conduit leading from the combustion chamber to the lower portion of the receptacle for discharging products of combustion from the chamber beneath the surface of the water in the receptacle, a water jacket extending along said conduit and having its outlet end within the receptacle, a pipe leading from the lower portion of the receptacle through the combustion chamber, passing around the pump and discharging into the jacket, and a gas discharge pipe extending from the upper portion of the receptacle back and forth through the water in the receptacle for imparting the heat from the gas to said water.

In testimony whereof I affix my signature.

PEARL PENELOPE PAYNE.